(12) United States Patent
Griffith et al.

(10) Patent No.: US 7,757,220 B2
(45) Date of Patent: Jul. 13, 2010

(54) COMPUTER INTERCHANGE OF KNOWLEDGE HIERARCHIES

(75) Inventors: Todd Griffith, Williamsport, PA (US);
Robert Ross, Williamsport, PA (US);
Sean Melody, Williamsport, PA (US)

(73) Assignee: Discovery Machine, Inc., Williamsport, PA (US)

( * ) Notice: Subject to any disclaimer, the term of this patent is extended or adjusted under 35 U.S.C. 154(b) by 1560 days.

(21) Appl. No.: 10/969,617

(22) Filed: Oct. 21, 2004

(65) Prior Publication Data

US 2006/0101424 A1    May 11, 2006

(51) Int. Cl.
*G06F 9/45* (2006.01)
*G06F 19/00* (2006.01)
*G06F 17/00* (2006.01)
*G06F 15/16* (2006.01)
*G06F 3/00* (2006.01)

(52) U.S. Cl. .................. 717/136; 700/104; 706/45; 709/246; 715/748

(58) Field of Classification Search ............... 717/105, 717/136; 715/239, 748; 706/45; 700/104; 709/246
See application file for complete search history.

(56) References Cited

U.S. PATENT DOCUMENTS

| | | | |
|---|---|---|---|
| 6,535,863 B1* | 3/2003 | O'Reilly ................. | 706/45 |
| 7,240,109 B2* | 7/2007 | Wookey et al. .......... | 709/223 |
| 7,257,455 B1* | 8/2007 | Griffith et al. ........... | 700/104 |
| 7,424,701 B2* | 9/2008 | Kendall et al. .......... | 717/105 |
| 7,500,195 B2* | 3/2009 | Sahota et al. ........... | 715/733 |
| 2002/0073236 A1* | 6/2002 | Helgeson et al. ........ | 709/246 |
| 2003/0149934 A1* | 8/2003 | Worden .................. | 715/513 |
| 2003/0233631 A1* | 12/2003 | Curry et al. ............ | 717/100 |
| 2004/0122788 A1* | 6/2004 | Griffith et al. .......... | 706/61 |
| 2005/0288920 A1* | 12/2005 | Green et al. ............ | 704/3 |
| 2006/0031227 A1* | 2/2006 | Cope et al. .............. | 707/10 |

OTHER PUBLICATIONS

Murdock, J. William, "Prolegomena to a Task-Method-Knowledge Theory of Cognition", Aug. 1998, Proceedings of the Twentieth Annual Conference of the Cognitive Science Society, pp. 746-751.*
Aha et al., "AHEAD: Analogical Hypothesis Elaboration for Activity Detection"; Jul. 31, 2003, Intelligent Decision Aids Group, Navy Center for Applied Research in AI, Project Review, pp. 1-79.*
Murdock, "Semi-Formal Functional Software Modeling with TMK", Feb. 11, 2000, Georgia Institute of Technology, Technical Report GIT-CC-00-05; pp. 1-9.*

* cited by examiner

*Primary Examiner*—Wei Y Zhen
*Assistant Examiner*—Chih-Ching Chow
(74) *Attorney, Agent, or Firm*—Haynes and Boone, LLP

(57) ABSTRACT

A means for exporting a Task-Method-Knowledge (TMK) hierarchy is disclosed using XML as an intermediate file format. Using a computer interface, a user selects the TMK hierarchy, or portion of a TMK hierarchy, to export. The elements of the selected are written to a XML document using an XML schema specifically designed for the task. The order of element export assures that elements and relationships between elements are complete. The exported hierarchy as an XML document is transported to another XML hierarchy and imported. The user selects a receiving TMK project on the receiving system and resolves any naming conflicts.

10 Claims, 2 Drawing Sheets

COMPUTER INTERCHANGE OF KNOWLEDGE HIERARCHIES

BACKGROUND OF THE INVENTION

1. Field of the Invention

The current invention relates to computer systems in general and specifically to computer-based knowledge systems and the interchange of knowledge information.

2. Description of Related Art

Computer knowledge acquisition systems attempt to make computers "expert" in some area by drawing knowledge from experts, encoding this knowledge for use in a computer system, and providing software programs that use this knowledge to develop solutions. In current art, the subject matter expert working alone or with a knowledge system engineer, enter strategic knowledge information in the form of language statements or knowledge hierarchies. Several strategies and techniques exist for the entry of knowledge information. One approach utilizes a task-method-knowledge ("TMK") hierarchy that encodes problem-solving strategies in a hierarchy representing strategies developed by experts for specific problems. In a TMK hierarchy, a problem is solved by a process of defined methods, tasks, subtasks, procedures, and the reference to pre-defined models or classes. For example, a hierarchy to define a new drug for treatment of a specific disease may include methods for modifying existing drugs and the tasks, subtasks, and procedures for the modification. It may also include the models and classes of existing drugs that may form the basis of the modification. Once complete, such a hierarchy could be extracted and transported to another system to be used by others searching for drug solutions. Or it could be transported and merged with another hierarchy to provide a richer, more robust knowledge system. To extract and export a complete hierarchy would comprise the extraction, formatting to a standard form, and writing to a transportable file all elements of the hierarchy.

In current art, TMK hierarchies are defined either as a set of textual language statements similar to a programming language such as LISP, or they exist in a form internal to the visual entry knowledge system. While these forms are both appropriate and useful in solving the problems for which the hierarchies were developed, these forms of knowledge representation are not interchangeable. Neither form can be combined with other knowledge systems. In the textual form of current systems, the names of hierarchy elements defined in the language statements must match references to the elements, and while such name matching is consistent within a single hierarchy, work must be done to match names when combining two hierarchies. Thus to merge two hierarchies in the textual form requires that the names and other properties, for example, data type, of the elements must match the references to the elements. Moreover, while within a single hierarchy, processes are in place to perform this work. For example, when compiled, LISP programs will generate name and data type mismatches, when merging two hierarchies; the name and property match is done manually through inspection. This work is often difficult and error-prone. Similarly, the internal form of one hierarchy cannot easily be combined with another. If the internal forms are different, any incompatibilities in element representation will make the combining of hierarchies impossible. Even if the internal forms are identical, the problem of combining hierarchies becomes similar and just as difficult as the combining of text language statements.

The motivation for combining hierarchies lies in two areas. First, the collaboration on large projects will require the combining of the separate components. Second, the packaging for the marketplace of knowledge hierarchies requires a process by which the purchaser can "install" the knowledge to prepare for use.

What is needed is a method for first the extraction of a knowledge hierarchy into a standard and transportable format, and then the process by which the extracted knowledge is installed and possibly combined with other hierarchies on the same or other similar knowledge system.

SUMMARY AND OBJECTS OF THE PRESENT INVENTION

The present invention comprises two components. The first is the extraction and exportation of a complete or partial TMK hierarchy to a standard format. The second is the installation and importation of one or more objects of an extracted hierarchy. A method is provided for the extraction of a defined hierarchy into a standard transportable format. This method will start at the root of the hierarchy to be extracted, traverses the hierarchy, and extracts each element encountered until all elements have been extracted. A starting point other than the root may be declared in which case the sub-hierarchy or class is exported. The extracted information is converted to a standard format and written to a results file. When all elements have been extracted, the file is closed and available for transportation to another knowledge system.

The installation method receives the extracted information and installs the hierarchy by first installing information about the hierarchy. Ambiguities and conflicts are then resolved through interactions with the user. Finally, from the information in the extracted file, each element of the hierarchy is installed.

It is an object of the present invention to provide a software process for the extraction of a complete or partial TMK hierarchy from a computer system to an intermediate form. It is another object of the present invention to allow the extracted hierarchy to be transported and installed on a second computer system, allowing the user to select all or part of the hierarchy to install. It is a further object of the present invention to allow the user to resolve any ambiguities or conflicts during the installation process.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

BEST MODE AND OTHER EMBODIMENTS OF THE INVENTION

Figure 1:
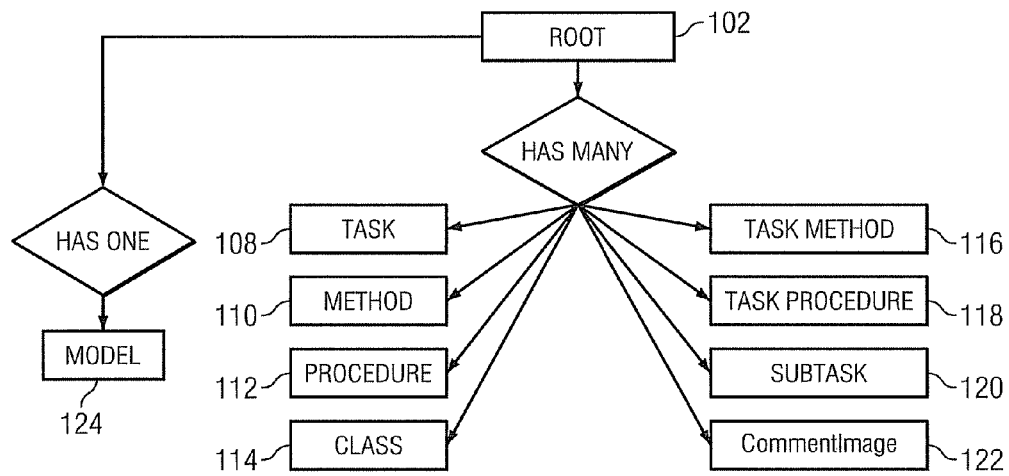
FIG. 1 illustrates the relationships between elements in a TMK hierarchy

A TMK hierarchy is a tree structure. Nodes of the tree represent the elements of the hierarchy, tasks, methods, procedures, etc. The nodes are linked in parent-child relationships that define the precise tree structure of the hierarchy. Table 1 illustrates one embodiment of the element types of a TMK hierarchy.

TABLE 1

| Name | Description |
| --- | --- |
| Model | Describes the model |
| Task | Contains task nodes for each task represented by this model. |
| Method | Contains method nodes for each method represented by this model. |
| Procedure | Contains procedures nodes for each procedure represented by this model. |
| Class | Contains class nodes for each class represented by this model. |

TABLE 1-continued

| Name | Description |
| --- | --- |
| TaskMethod | Contains information about links between tasks and methods and mapping information. |
| TaskProcedure | Contains information about links between tasks and procedures and mapping information. |
| Subtask | Contains information about links between methods and tasks and mapping information |
| IterationLink | Represents an iteration link between two tasks under the parent method. |
| CommentImage | Holds the information for images imbedded in comments. |
| Component | A class data member that is a primitive type or another class |
| Connection | A class data member that joins two components and has an optional substance passing through it. |
| Behavior | A method related to a class |
| Primitive Behavior | A procedure related to a class. |
| Function | An entity modeled after SBF functions. It is part of a class and a task with a single method that is a behavior of the same class. |
| Blackboard Variable | A global variable that can have its value set and retrieved using the specialized functions |
| Enumeration | A global collection that can be accessed by name. An enumeration has names for each collection entry |

Each of the element types has information associated with it. Table 2 illustrates one embodiment of the information associated with the "method" element type.

| Name | Type | Constraints | Default | Req'd. | Description |
| --- | --- | --- | --- | --- | --- |
| ModelName | string | len = 64 | | y | Name of the project. |
| ModelDescription | string | len = 512 | | n | Description of the project. |
| ModelAuthor | string | len = 64 | | n | Name of the author or team. |
| ModelCompany | string | len = 64 | | n | Name of the company developing the project. |
| ModelVersion | int | Number must be greater than 0. | 1 | y | The version of the database for this project. |
| ModelRoot | Model Root | — | | y | Delineates the root element of this model. Most likely, this is the first element in the file. |

Similarly, each of the other element types has a set of related information stored with each instance of the element type. These are shown in tables 3-12.

TABLE 2

| Name | Description |
|---|---|
| MethodName | Method name |
| MethodDescription | Method description |
| MethodComment | The method's comment |
| Input | Contains an input element for each input of this method. |
| Output | Contains an output element for each output of this method. |

TABLE 4

| Name | Type | Constraints | Default | Req'd. | Description |
|---|---|---|---|---|---|
| ModelName | string | len = 64 | | y | Name of the project. |
| ModelDescription | string | len = 512 | | n | Description of the project. |
| ModelAuthor | string | len = 64 | | n | Name of the author or team. |
| ModelCompany | string | len = 64 | | n | Name of the company developing the project. |
| ModelVersion | int | Number must be greater than 0. | 1 | y | The version of the database for this project. |
| ModelRoot | Model Root | — | | y | Delineates the root element of this model. Most likely, this is the first element in the file. |

TABLE 5

| Name | Type | Constraints | Default | Req'd. | Description |
|---|---|---|---|---|---|
| ProcedureName | string | len = 64 | | y | Name of the procedure |
| ProcedureDescription | string | len = 512 | | n | Description of the procedure |
| ProcedurePrecondition | string | len = 512 | | n | Precondition expression for the procedure. |
| ProcedureComment | Comment | — | | n | The procedure's comment. |
| Action | Action | 0 . . . n | | n | Contains the actions of this TMKProcedure. |
| Input | Input | 0 . . . n | | n | Contains an input element for each input of this procedure. |
| Output | Output | 0 . . . n | | n | Contains an output element for each output of this procedure. |

TABLE 6

| Name | Type | Constraints | Default | Req'd. | Description |
|---|---|---|---|---|---|
| TaskMethodTaskName | TaskName | — | | y | Name of the parent task |
| TaskMethodMethodName | MethodName | — | | y | Name of the child method. |
| TaskMethodDescription | string | len = 512 | | n | Description of the link |
| TaskMethodOrder | int | must be greater than or equal to zero | | y | Order of the link. |
| TaskMethodCondition | string | len = 512 | | n | The condition under which to run the method. Tests the task's inputs and outputs. |
| TaskMethodComment | Comment | — | | n | A Comment for this link. |
| InputMap | InputMap | 0 . . . n | | n | Maps between a variable and an input. |
| OutputMap | OutputMap | 0 . . . n | | n | Maps between an output and an output. |

TABLE 7

| Name | Type | Constraints | Default | Req'd. | Description |
| --- | --- | --- | --- | --- | --- |
| TaskProcedureTaskName | TaskName | — | | y | The name of the parent task. |
| TaskProcedureProcedureName | ProcedureName | — | | y | The name of the child procedure. |
| TaskProcedureDescription | string | len = 512 | | n | Description of the link |
| TaskProcedureOrder | int | must be greater than or equal to zero | | y | Order of the link. |
| TaskProcedureCondition | string | len = 512 | | n | The condition under which to run the procedure. Tests the task's inputs and outputs. |
| TaskProcedureComment | Comment | — | | n | A Comment for this link. |
| InputMap | InputMap | 0 . . . n | | n | Maps between a variable and an input. |
| OutputMap | OutputMap | 0 . . . n | | n | Maps between an output and an output. |

TABLE 8

| Name | Type | Constraints | Default | Req'd. | Description |
| --- | --- | --- | --- | --- | --- |
| SubtaskMethodName | MethodName | — | | y | The parent method. |
| SubtaskTaskName | TaskName | — | | y | Refers to the task that is the sub-task. |
| SubtaskOrder | int | >0 | | y | Refers to the position of this task in the chain under the method. |
| InputMap | InputMap | 0 . . . n | | n | Maps between a variable and an input. |
| OutputMap | OutputMap | 0 . . . n | | n | Maps between a variable and an output. |

TABLE 9

| Name | Type | Constraints | Default | Req'd. | Description |
| --- | --- | --- | --- | --- | --- |
| IterationLinkMethod | MethodName | — | | y | The method where the source and destination tasks must reside as subtasks. |
| IterationLinkSourceTask | TaskName | — | | y | Source task name. |
| IterationLinkDestinationTask | TaskName | — | | y | Destination task name. |
| IterationLinkOnFail | Boolean | — | false | y | Whether or not the iteration link is followed when the source subtask fails. |
| IterationLinkDescription | string | len = 512 | | n | Description for the iteration link |
| IterationLinkComment | Comment | — | | n | The iteration link's comment. |
| IterationLinkCondition | string | len = 512 | | n | The condition to use for the link, if not set to iterate on failure. |

TABLE 10

| Name | Type | Constraints | Default | Req'd. | Description |
| --- | --- | --- | --- | --- | --- |
| ImageID | string | — | | y | Stores the unique identifier (VMID) of the image. |
| ImageSource | string | — | | y | Stores the original filename for the image. |
| ImageData | string | — | | y | A series of byte values in hexadecimal format. The byte values have 128 added to them so that each is a positive integer from 0 to 255. |

TABLE 11

| Name | Type | Constraints | Default | Req'd. | Description |
|---|---|---|---|---|---|
| ComponentName | string | len = 64 | | y | Name of the component. |
| ComponentType | ClassName, EnumerationName, or primitive string. | A valid class or enumeration (must be defined in this model) or a string that will parse into a valid SBFPrimitive or SBFComplex type. | | y | Determines the type of primitive, enumeration, or class value that this component represents or the type of primitive, enumeration, or class in this collection component. |
| ComponentCollection | Boolean | — | false | y | Whether the component is a collection. ComponentType will denote what type of collection it is. |
| ComponentDescription | String | len = 512 | | n | The description of this component. |
| ComponentComment | Comment | — | | | A comment for this component. |

TABLE 12

| Name | Type | Constraints | Default | Req'd. | Description |
|---|---|---|---|---|---|
| BlackboardName | string | len = 64 | | y | Name of the blackboard. |
| BlackboardDescription | string | len = 512 | | n | Description of the blackboard. |
| BlackboardType | ClassName, Enumeration-Name, or primitive string. | A valid class, enumeration, (must be defined in this model) or a string that will parse into a valid SBFPrimitive or SBFComplex type. | | y | Determines the type of primitive, enumeration, or class that this variable represents or the type of primitive, enumeration, or class in this collection. |
| BlackboardCollection | Boolean | — | false | y | Whether the blackboard is a collection. BlackboardType will denote what type of collection it is. |
| BlackboardComment | Comment | | | | The blackboard variable comment. |

The present invention uses XML as the intermediate form for the hierarchy. This format is well known and supported by a number of systems. An XML document contains tagged information that is under control of a "schema". The schema defines the information and its relationship to other information in the document. A schema for TMK hierarchies is used to store the information for each TMK element during the extraction process. The TMK-XML document is then used in the installation process to reconstruct the hierarchy.

The XML schema contains definitions for all element types. The XML schema for the elements in table 1 is shown in table 3.

TABLE 3

```
<xsd:schema xmlns:xsd="http://www.w3.org/2001/XMLschema" version="1">
<xsd:annotation>
<xsd:documentation xml:lang="en">
   Discovery Machine Model Schema
   </xsd:documentation>
</xsd:annotation>
<xsd:element name="Root" type="Root"/>
<xsd:complexType name="Root">
<xsd:choice maxOccurs="unbounded">
    <xsd:element name="Model" type="Model" />
  <xsd:element name="Task" type="Task" minOccurs="0" maxOccurs="unbounded"/>
  <xsd:element name="Method" type="Method" minOccurs="0" maxOccurs="unbounded"/>
  <xsd:element name="Procedure" type="Procedure" minOccurs="0" maxOccurs="unbounded"/>
```

TABLE 3-continued

```
    <xsd:element name="Class" type="Class" minOccurs="0" maxOccurs="unbounded"/>
    <xsd:element name="TaskMethod" type="TaskMethod" minOccurs="0" maxOccurs="unbounded"/>
    <xsd:element name="TaskProcedure" type="TaskProcedure" minOccurs="0"
maxOccurs="unbounded"/>
    <xsd:element name="Subtask" type="Subtask" minOccurs="0" maxOccurs="unbounded"/>
    <xsd:element name="IterationLink" type="IterationLink" minOccurs="0" maxOccurs="unbounded"/>
    <xsd:element name="CommentImage" type="CommentImage" minOccurs="0"
maxOccurs="unbounded"/>
    <xsd:element name="Enumeration" type="Enumeration" minOccurs="0"
maxOccurs="unbounded"/>
    <xsd:element name="Blackboard" type="Blackboard" minOccurs="0" maxOccurs="unbounded"/>
    <xsd:element name="ConditionTask" type="ConditionTask" minOccurs="0"
maxOccurs="unbounded"/>
<xsd:element name="ClassDisplay" type="ClassDisplay" minOccurs="0" maxOccurs="unbounded"/>
<xsd:element name="Image" type="Image" minOccurs="0" maxOccurs="unbounded"/>
    </xsd:choice>
</xsd:complexType>
<xsd:complexType name="Model">
    <xsd:sequence>
    <xsd:element name="ModelName" type="xsd:string" />
    <xsd:element name="ModelDescription" type="xsd:string" minOccurs="0" />
    <xsd:element name="ModelAuthor" type="xsd:string" minOccurs="0" />
    <xsd:element name="ModelCompany" type="xsd:string" minOccurs="0" />
    <xsd:element name="ModelVersion" type="xsd:int" />
    <xsd:element name="ModelRoot" >
        <xsd:complexType>
            <xsd:attribute name="name" type="xsd:string" use="required"/>
            <xsd:attribute name="type" type="xsd:string" use="required"/>
        </xsd:complexType>
        </xsd:element>
    </xsd:sequence>
</xsd:complexType>
<xsd:complexType name="TaskMethod">
    <xsd:sequence>
    <xsd:element name="TaskMethodTaskName" type="xsd:string" />
    <xsd:element name="TaskMethodMethodName" type="xsd:string" />
    <xsd:element name="TaskMethodDescription" type="xsd:string" minOccurs="0" />
    <xsd:element name="TaskMethodOrder" type="xsd:int" />
    <xsd:element name="TaskMethodCondition" type="xsd:string" minOccurs="0" />
    <xsd:element name="TaskMethodComment" type="xsd:string" minOccurs="0" maxOccurs="1" />
    <xsd:element name="InputMap" type="InputMap" minOccurs="0" maxOccurs="unbounded"/>
    <xsd:element name="OutputMap" type="OutputMap" minOccurs="0" maxOccurs="unbounded"/>
    </xsd:sequence>
</xsd:complexType>
<xsd:complexType name="TaskProcedure">
    <xsd:sequence>
    <xsd:element name="TaskProcedureTaskName" type="xsd:string" />
    <xsd:element name="TaskProcedureProcedureName" type="xsd:string" />
    <xsd:element name="TaskProcedureDescription" type="xsd:string" minOccurs="0" />
    <xsd:element name="TaskProcedureOrder" type="xsd:int" />
    <xsd:element name="TaskProcedureCondition" type="xsd:string" minOccurs="0" />
    <xsd:element name="TaskProcedureComment" type="xsd:string" minOccurs="0" maxOccurs="1" />
    <xsd:element name="InputMap" type="InputMap" minOccurs="0" maxOccurs="unbounded"/>
    <xsd:element name="OutputMap" type="OutputMap" minOccurs="0" maxOccurs="unbounded"/>
    </xsd:sequence>
</xsd:complexType>
<xsd:complexType name="Subtask">
    <xsd:sequence>
    <xsd:element name="SubtaskMethodName" type="xsd:string" />
    <xsd:element name="SubtaskTaskName" type="xsd:string" />
    <xsd:element name="SubtaskOrder" type="xsd:int"/>
    <xsd:element name="InputMap" type="InputMap" minOccurs="0" maxOccurs="unbounded"/>
    <xsd:element name="OutputMap" type="OutputMap" minOccurs="0" maxOccurs="unbounded"/>
    </xsd:sequence>
</xsd:complexType>
<xsd:complexType name="Task">
    <xsd:sequence>
    <xsd:element name="TaskName" type="xsd:string" />
    <xsd:element name="TaskDescription" minOccurs="0" maxOccurs="1" type="xsd:string" />
    <xsd:element name="TaskCondition" type="xsd:string" minOccurs="0" maxOccurs="1" />
    <xsd:element name="TaskPrecondition" minOccurs="0" maxOccurs="1" type="xsd:string" />
    <xsd:element name="TaskComment" type="xsd:string" minOccurs="0" maxOccurs="1" />
    <xsd:element name="TaskTopTask" type="xsd:boolean" />
    <xsd:element name="Input" type="Input" minOccurs="0" maxOccurs="unbounded"/>
    <xsd:element name="Output" type="Output" minOccurs="0" maxOccurs="unbounded"/>
    </xsd:sequence>
</xsd:complexType>
```

TABLE 3-continued

```
<xsd:complexType name="Method">
  <xsd:sequence>
  <xsd:element name="MethodName" type="xsd:string" />
  <xsd:element name="MethodDescription" minOccurs="0" maxOccurs="1" type="xsd:string" />
  <xsd:element name="MethodPrecondition" minOccurs="0" maxOccurs="1" type="xsd:string" />
  <xsd:element name="MethodComment" type="xsd:string" minOccurs="0" maxOccurs="1" />
  <xsd:element name="Input" type="Input" minOccurs="0" maxOccurs="unbounded"/>
  <xsd:element name="Output" type="Output" minOccurs="0" maxOccurs="unbounded"/>
  </xsd:sequence>
</xsd:complexType>
<xsd:complexType name="Procedure">
  <xsd:sequence>
  <xsd:element name="ProcedureName" type="xsd:string" />
  <xsd:element name="ProcedureDescription" minOccurs="0" maxOccurs="1" type="xsd:string" />
  <xsd:element name="ProcedurePrecondition" minOccurs="0" maxOccurs="1" type="xsd:string" />
  <xsd:element name="ProcedureComment" type="xsd:string" minOccurs="0" maxOccurs="1" />
     <xsd:element name="Action" type="Action" minOccurs="0" maxOccurs="unbounded"/>
  <xsd:element name="Input" type="Input" minOccurs="0" maxOccurs="unbounded"/>
  <xsd:element name="Output" type="Output" minOccurs="0" maxOccurs="unbounded"/>
  </xsd:sequence>
</xsd:complexType>
<xsd:complexType name="Input">
  <xsd:sequence>
  <xsd:element name="InputName" type="xsd:string" />
  <xsd:element name="InputType" type="xsd:string" />
  <xsd:element name="InputCollection" type="xsd:boolean" />
  </xsd:sequence>
</xsd:complexType>
<xsd:complexType name="InputMap">
  <xsd:sequence>
  <xsd:element name="InputMapChildInput" type="xsd:string" />
  <xsd:element name="InputMapMapFrom" type="xsd:string" />
  <xsd:element name="InputMapLinkType" type="xsd:string" />
  </xsd:sequence>
</xsd:complexType>
<xsd:complexType name="Output">
  <xsd:sequence>
  <xsd:element name="OutputName" type="xsd:string" />
  <xsd:element name="OutputType" type="xsd:string" />
  <xsd:element name="OutputCollection" type="xsd:boolean" />
  </xsd:sequence>
</xsd:complexType>
<xsd:complexType name="OutputMap">
  <xsd:sequence>
  <xsd:element name="OutputMapChildOutput" type="xsd:string" />
  <xsd:element name="OutputMapMapTo" type="xsd:string" />
  <xsd:element name="OutputMapLinkType" type="xsd:string" />
  </xsd:sequence>
</xsd:complexType>
<xsd:complexType name="Action">
  <xsd:sequence>
  <xsd:element name="ActionLeft" type="xsd:string" />
  <xsd:element name="ActionRight" type="xsd:string" />
  <xsd:element name="ActionOrder" type="xsd:int" />
  <xsd:element name="ActionEnabled" type="xsd:boolean" minOccurs="0" maxOccurs="1"/>
  <xsd:element name="ActionDescription" type="xsd:string" minOccurs="0"/>
  </xsd:sequence>
</xsd:complexType>
<xsd:complexType name="Class">
  <xsd:sequence>
  <xsd:element name="ClassName" type="xsd:string" />
    <xsd:element name="ClassComment" type="xsd:string" minOccurs="0"/>
     <xsd:choice maxOccurs="unbounded">
       <xsd:element name="Component" type="Component" minOccurs="0" maxOccurs="unbounded"/>
       <xsd:element name="Substance" type="Substance" minOccurs="0" maxOccurs="unbounded"/>
       <xsd:element name="Connection" type="Connection" minOccurs="0" maxOccurs="unbounded"/>
         <xsd:element name="Behavior" type="xsd:string" minOccurs="0" maxOccurs="unbounded"/>
       <xsd:element name="PrimitiveBehavior" type="xsd:string" minOccurs="0" maxOccurs="unbounded"/>
         <xsd:element name="Function" type="xsd:string" minOccurs="0" maxOccurs="1"/>
     </xsd:choice>
    </xsd:sequence>
</xsd:complexType>
```

TABLE 3-continued

```
<xsd:complexType name="Component">
  <xsd:sequence>
  <xsd:element name="ComponentName" type="xsd:string" />
  <xsd:element name="ComponentType" type="xsd:string" />
  <xsd:element name="ComponentCollection" type="xsd:boolean" />
  <xsd:element name="ComponentDescription" minOccurs="0" maxOccurs="1" type="xsd:string" />
  <xsd:element name="ComponentComment" type="xsd:string" minOccurs="0" maxOccurs="1" />
  </xsd:sequence>
</xsd:complexType>
<xsd:complexType name="Substance">
  <xsd:sequence>
  <xsd:element name="SubstanceName" type="xsd:string" />
  <xsd:element name="SubstanceType" type="xsd:string" />
  <xsd:element name="SubstanceCollection" type="xsd:boolean" />
  <xsd:element name="SubstanceDescription" minOccurs="0" type="xsd:string" />
  <xsd:element name="SubstanceComment" type="xsd:string" minOccurs="0" maxOccurs="1" />
  </xsd:sequence>
</xsd:complexType>
<xsd:complexType name="Connection">
  <xsd:sequence>
  <xsd:element name="ConnectionName" type="xsd:string" />
  <xsd:element name="ConnectionType" type="xsd:string" />
  <xsd:element name="ConnectionFrom" type="xsd:string" minOccurs="0" maxOccurs="1"/>
  <xsd:element name="ConnectionTo" type="xsd:string" minOccurs="0" maxOccurs="1"/>
  <xsd:element name="ConnectionSubstance" type="xsd:string" minOccurs="0" maxOccurs="1"/>
  <xsd:element name="ConnectionDescription" minOccurs="0" maxOccurs="1" type="xsd:string" />
  <xsd:element name="ConnectionComment" type="xsd:string" minOccurs="0" maxOccurs="1" />
  </xsd:sequence>
</xsd:complexType>
<xsd:complexType name="IterationLink">
  <xsd:sequence>
  <xsd:element name="IterationLinkMethod" type="xsd:string" />
  <xsd:element name="IterationLinkSourceTask" type="xsd:string" />
  <xsd:element name="IterationLinkDestinationTask" type="xsd:string" />
  <xsd:element name="IterationLinkOnFail" type="xsd:boolean" />
  <xsd:element name="IterationLinkDescription" type="xsd:string" minOccurs="0" />
  <xsd:element name="IterationLinkComment" type="xsd:string" minOccurs="0" maxOccurs="1" />
  <xsd:element name="IterationLinkCondition" type="xsd:string" minOccurs="0" />
  </xsd:sequence>
</xsd:complexType>
<xsd:complexType name="CommentImage">
  <xsd:sequence>
  <xsd:element name="ImageID" type="xsd:string" />
  <xsd:element name="ImageSource" type="xsd:string" />
  <xsd:element name="ImageData" type="xsd:string" />
  </xsd:sequence>
</xsd:complexType>
<xsd:complexType name="Enumeration">
  <xsd:sequence>
  <xsd:element name="EnumerationName" type="xsd:string" />
  <xsd:element name="EnumerationType" type="xsd:string" />
  <xsd:element name="EnumerationCollection" type="xsd:boolean" />
  <xsd:element name="EnumerationIndex" type="EnumerationIndex" minOccurs="0" maxOccurs="unbounded"/>
  </xsd:sequence>
</xsd:complexType>
<xsd:complexType name="EnumerationIndex">
  <xsd:sequence>
    <xsd:element name="EnumerationIndexOrder" type="xsd:integer" />
    <xsd:element name="EnumerationIndexName" type="xsd:string" />
    <xsd:element name="EnumerationValue" type="EnumerationValue" minOccurs="0" maxOccurs="unbounded"/>
  </xsd:sequence>
</xsd:complexType>
<xsd:complexType name="EnumerationValue">
  <xsd:sequence>
    <xsd:element name="EnumerationValuePath" type="xsd:string" />
    <xsd:element name="EnumerationValuePrimValue" type="xsd:string" />
    <xsd:element name="EnumerationValuePrimType" type="xsd:string" />
  </xsd:sequence>
</xsd:complexType>
<xsd:complexType name="Blackboard">
  <xsd:sequence>
  <xsd:element name="BlackboardName" type="xsd:string" />
  <xsd:element name="BlackboardDescription" type="xsd:string" minOccurs="0" maxOccurs="1" />
  <xsd:element name="BlackboardType" type="xsd:string" />
```

TABLE 3-continued

```
<xsd:element name="BlackboardCollection" type="xsd:boolean" />
<xsd:element name="BlackboardComment" type="xsd:string" minOccurs="0" maxOccurs="1" />
  </xsd:sequence>
</xsd:complexType>
<xsd:complexType name="ConditionTask">
  <xsd:sequence>
    <xsd:element name="ConditionTaskName" type="xsd:string" />
    <xsd:element name="ConditionType" type="xsd:string" />
    <xsd:element name="ConditionSource" type="xsd:string" />
    <xsd:element name="ConditionDestination" type="xsd:string" minOccurs="0" maxOccurs="1"/>
    <xsd:element name="InputMap" type="InputMap" minOccurs="0" maxOccurs="unbounded"/>
    <xsd:element name="OutputMap" type="OutputMap" minOccurs="0" maxOccurs="unbounded"/>
  </xsd:sequence>
</xsd:complexType>
<xsd:complexType name="Image">
  <xsd:sequence>
    <xsd:element name="ImageName" type="xsd:string"/>
    <xsd:element name="ImageData" type="xsd:string"/>
  </xsd:sequence>
</xsd:complexType>
<xsd:complexType name="ClassDisplay">
  <xsd:sequence>
    <xsd:element name="ClassName" type="xsd:string" />
    <xsd:element name="ClassLineStyle" type="xsd:string" />
    <xsd:element name="ClassImage" type="xsd:string" minOccurs="0"/>
    <xsd:element name="ClassLinkColor" type="xsd:string" minOccurs="0"/>
    <xsd:element name="ClassDisplayType" type="xsd:string" />
  </xsd:sequence>
</xsd:complexType>
</xsd:schema>
```

Figure 2:
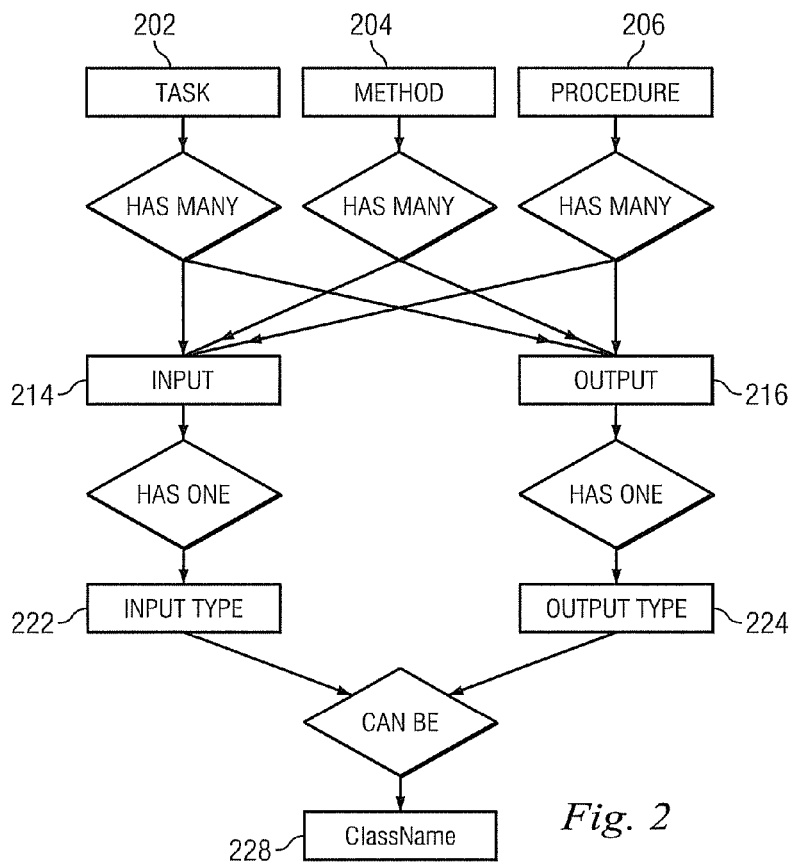
FIG. 2 illustrates one structure of relationship between Methods, Tasks, and Procedures and their Inputs and Outputs
Figure 3:
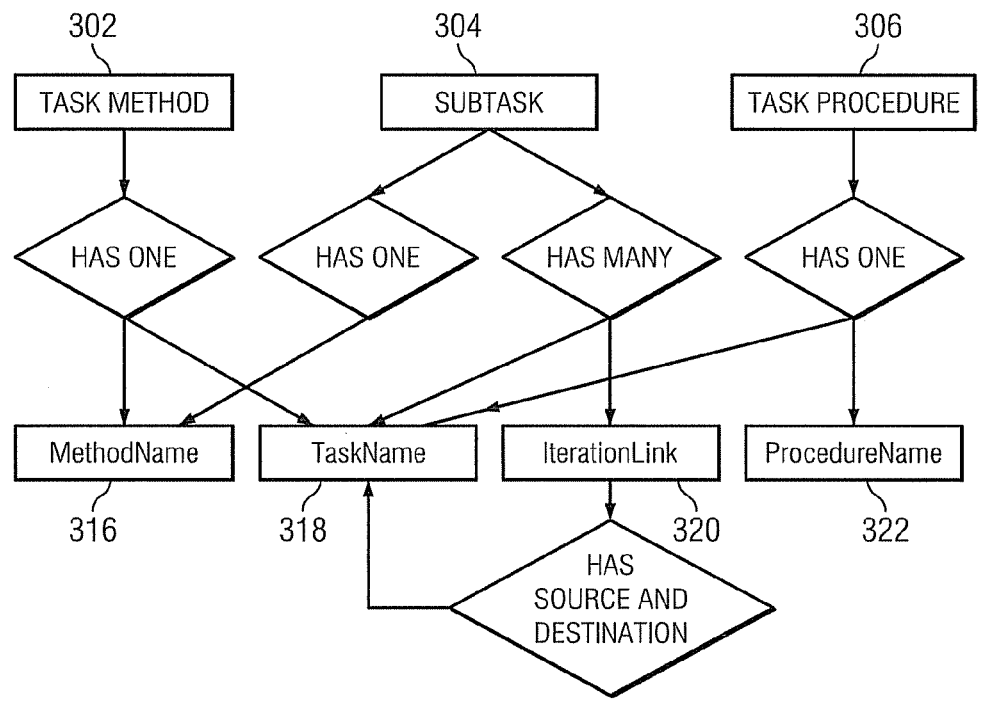
FIG. 3 illustrates further relationships between the elements of a TMK hierarchy
Figure 4:
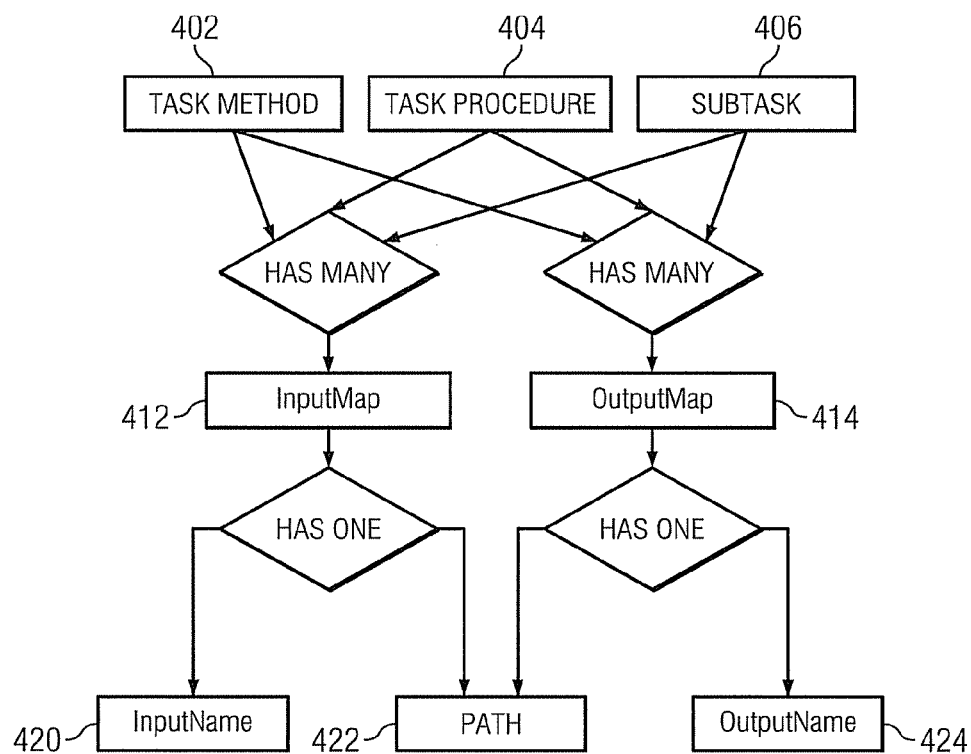
FIG. 4 illustrates one XML schema describing the elements in the exported XML document

FIG. 1 illustrates how the elements of Table 1 are related in a TMK hierarchy. The root of the hierarchy 102 has one related Model element 124, and has many of the element types Task 108, Method 110, Procedure 112, Class 114, TaskMethod 116, TaskProcedure 118, Subtask 120, and CommentImage 122. FIG. 2 illustrates how other elements are related. Each Task 202, Method 204, and Procedure 206 has many inputs 214 and outputs 216. Each Input 214 has one InputType 222. Each Output 216 has one OutputType 224. Each InputType 222 and each OutputType 224 can be a ClassName 228. FIG. 3 illustrates how still other elements are related. Each TaskMethod 302 has one MethodName 316 and one TaskName 318. Each Subtask 304 has one MethodName 316 and many TaskName 318 and many IterationLink 320. Each IterationLink 320 has source and destination for a TaskName. Each TaskProcedure 306 has one TaskName 318 and one ProcedureName 322. Finally, FIG. 4 illustrates other relationships between elements. Each TaskMethod 402, TaskProcedure 404, and Subtask 406 has many InputMap 412 and many OutputMap 414. Each InputMap 412 has one InputName 420 and one path 422. Each OutputMap 414 has one OutputName 424 and one path 422.

The extract and export process (hereafter referred to as "export") takes the following steps:

1. The user indicates that export is desired, and indicates what is to be exported, whether a single class, a list of elements (an "enumeration"), a sub-hierarchy (all elements below a designated element), or the entire hierarchy.

2. An output document is created to receive the XML data. This process uses for example, the DocumentBuilderFactory and DocumentBuilder classes of the standard Java XML parser classes, for example, from Sun Corporation. The resulting document is a standard Document Object Model (DOM) document. DOM documents are a standard, well-known format.

3. The user has selected the sub-hierarchy, class or enumeration for exporting, the exporting process can begin. In all three cases, the process begins by creating and initializing the XML document object and writing header information to it such as the project name, author, company and comments. This is done through a standard user interface. In the case of exporting a sub-hierarchy, the exporting process next exports all the blackboard variable definitions. Since blackboard variables are global in nature, they can be accessed by any expression and therefore all of them in the project need to be exported. After the blackboard variable definitions are exported, a recursive process begins to write out the sub-hierarchy. This recursive process is also used when exporting a class's behaviors, primitive behaviors, or function.

To export a sub-hierarchy in this recursive manner, the current TMK element (task, method or procedure) is first added to a list of tasks, methods, or procedures that have already been written to the XML document. (Since TMK elements can be reused in sub-hierarchies, this prevents duplication.) If the TMK element was not already exported, then it is written to the XML document object. This means writing the various properties of the TMK element such as names, descriptions, inputs, outputs, etc. After each of these properties is written to the XML document, each child TMK element is written to the XML documents. Child TMK elements of tasks are methods and procedures. Child TMK elements for tasks are for methods. All TMK elements can use condition hierarchies (tasks) to represent conditions.

Writing a child TMK element to the XML document consists of two parts. First, the child TMK element and its entire sub-hierarchy is written to the XML document. Secondly, the link between the TMK element and its child TMK element is written to the XML document. These link entities consist of the properties of the link such as the parent TMK element, child TMK element, description, comment, order, etc. The link entities also contain the information to map the inputs and outputs of the child TMK element to its parent TMK element. As each blackboard variable, input, or output is written to the XML object, any classes or enumerations it uses for its type are also written to the XML document as described below.

Classes are exported in four parts. First, its properties such as name, description, etc. are written to the XML object. Secondly, each of its components, substances, and connections are written to the XML object. If any of those members (components, substances, and connections) use a class or enumeration that has not been written to the XML object, that class or enumeration is also written to the XML object. Thirdly, the behaviors, primitive behaviors, and functions are written to the XML object as method sub-hierarchies, procedures, and task sub-hierarchies respectively.

Enumerations are exported in three parts. First, the properties such as the name, comment, etc. are written to the XML object. Secondly, any classes or enumerations used by the current enumeration not already written to the XML object are written to it as described above or here. Lastly, each value or index in the enumeration is written.

When all the parts of the sub-hierarchy, class, or enumeration have been written to the XML object, the XML object is written to a text file. Once written, the document contains all the information for the elements exported, including all the information needed to reconstruct the hierarchy when imported. The document is in a format of a fully compliant XML Document. The integrity of the XML document is assured by the XML Schema. The use of such schema is well known in the art.

The import of an exported hierarchy is accomplished by transporting the XML document containing the hierarchy to another system having a TMK hierarchy processor. The document may be transported physically, e.g., on a magnetic or optical disk, or it may be transported via communications systems, e.g., e-mail or file transfer protocol (FTP) systems.

Once the document is transported, it is read by an XML-sensitive processor that identifies the XML elements and makes them available for other processing. When the importing process begins, it is unknown what sort of entities will exist in the file. The process begins by validating the format of schema of the file. It must meet the schema standards adhered to by the importing process. If it does not adhere to the standards, the file is rejected and the process ends.

After validating the XML document, an XML object is created that allows for easier access to the XML file. The XML object is used to create lists of the tasks, methods, procedures, classes, enumerations, and blackboard variables that exist in the XML file. When running the import process interactively, these lists and information from the file such as the author, company, etc. are presented to the user in a prompt to continue the importing process. The user reviews the presented information and may select to continue or abandon the import process.

Once the user chooses to continue with the import, the user selects the project into which the imported elements are to be added. Since the import data and the receiving project are independent, there may be naming conflicts, i.e. the same name used in both. Any naming conflicts between existing entities in their project and imported entities must be resolved. Each of the lists mentioned above is checked against the names of the entities in the user's project. Each conflict is displayed to the user so that they can select a policy for resolving the conflicts. Resolution options are canceling the import, renaming all the conflicting imported entities, replacing all the existing conflicting entities, or using the existing entities in place of the imported entities. A map of imported entity names to existing entity names is built based on the users conflict resolution choice. This map is used when referencing the imported entities for the remainder of the importing process.

The next step is to import the class and enumeration data type entities into the project since so many of the other entities such as inputs, outputs, blackboards, class members, and enumerations refer to them. As class and enumeration elements are imported, stubs of the classes and enumerations are created. They are not completely defined, but are available to allow establishing references between elements.

Once the class and enumeration stubs are created, the import process creates the full enumerations. First, all the enumeration properties such as comments, descriptions, etc. are filled in. Next, all the values of each index are imported.

Because the classes reference tasks, methods and procedures for their functions, behaviors, and primitive behaviors, the classes cannot be fully imported until the tasks, methods, and procedures have been imported. Thus, each task, method, and procedure is then imported. Each TMK element is imported by reading its properties, inputs, and outputs from the XML object. At this point there is still no linkage between these TMK elements that provides the hierarchy. To construct the hierarchy, all the task-method, task-procedure, and method-task links, and all the condition task relationships.

While the use of XML documents are not unique to this process, and their use is well known, the use of them for exporting and importing TMK hierarchies is new and not obvious. Current art has TMK hierarchies existing as lines of text similar to the code of a programming language such as LISP, BASIC or C++, or as elements in a data base existing in an internal format, not suitable for an export and import process. The process allows a TMK hierarchy to be exported, transported, and imported into a different TMK processing system. This system provides a technical advantage over current art by being easy to use, flexible in exporting whole or subsets of hierarchies, using industry standards file formats, and robust in exporting and making available all information related to the hierarchy's elements. It provides a novel means of representing, transporting and exchanging knowledge.

We claim:

1. A method for processing of task-method-knowledge ("TMK") hierarchies, the method comprising:
    a) providing an interactive user interface,
    b) converting a TMK hierarchy to an XML document, wherein the converting comprises:
        1) creating and initializing an XML document to receive the converted hierarchy,
        2) exporting and converting all global variables, and
        3) recursively exporting elements selected to export, and
    c) subsequently converting the XML document back to a TMK hierarchy, wherein the subsequently converting comprises:
        1) creating an XML object to be used to create lists of the elements of a document selected to be imported,
        2) identifying a project into which data from the selected document is to be added,
        3) importing a class element into the identified project,
        4) importing an enumeration into the identified project,
        5) recursively importing an element of type task, method, or procedure, by reading the element's data from the selected document and writing to the identified project, and
        6) constructing a relationship link of type task-method, task-procedure, method-task, or condition-task relationships, and writing to the identified project.

2. The method of claim 1 further comprising accepting by the interactive user interface from the user an identify of the elements selected to export.

3. The method of claim 1, wherein the recursively exporting the elements selected to export comprises:
   a) initializing a list of exported elements,
   b) selecting a first element to export,
   c) converting the first element to XML and writing to the output document,
   d) adding the first element to export to the list of exported elements,
   e) recursively selecting a next element to export from the set of children of an exported element,
   f) if the selected element is not in the list of exported elements, converting the element to XML, writing to the output document, and adding the element to the list of exported elements,
   g) if the selected element is in the list of exported elements, no action is taken,
   h) processing steps e), f) and g) until all elements have been selected, converted to XML, written to the output document, and added to the list of exported elements.

4. The method of claim 3, wherein the exporting an element further comprises the steps of:
   a) writing the element and all children to the output document, and
   b) writing the information relating the element to each child element to the output document.

5. The method of claim 3, wherein the exporting a selected class element further comprises the steps of:
   a) writing the class properties to the output document,
   b) writing the class's components, substances, and connections to the output document,
   c) writing the class's behaviours, primitive behaviours, and functions the output document, and
   d) recursively writing all classes and enumerations used by the class element.

6. The method of claim 3, wherein
   the step of exporting a selected enumeration element further comprises the steps of:
   a) writing the properties of the selected enumeration to the output document,
   b) recursively exporting all classes and enumerations used by the selected enumeration element, and
   c) writing each value and index of the selected enumeration element to the output document.

7. The method of claim 1 further comprising,
   a) interacting with a user to identify the document to be imported,
   b) validating the document to be imported and, if the document fails to meet specific standard condition, ending the import process,
   c) displaying to the user information from the document to be imported and allowing the user to select to continue or end the import process,
   d) interacting with the user to identify the project into which the data from the document to be imported is to be added,
   e) interacting with the user to resolve a name conflict between an element in the project and an element in the document to be imported,
   f) when all elements are imported from the document to be imported, interacting with the user to show messages of progress, warnings, or errors encountered.

8. A method for the export of an element from a first task-method-knowledge ("TMK") hierarchy and the subsequent import of the element into a project in a second TMK hierarchy, the method comprising:
   a) obtaining from a user the identification of the element to be exported,
   b) creating and initializing an XML document,
   c) converting the element into a format acceptable to the XML document,
   d) writing the element to the XML document, including the property and relationship information of the element,
   e) transporting the XML document to a computer system containing the second TMK hierarchy,
   f) reading the XML document and converting the property and relationship information to a TMK format,
   g) interacting with the user to identify the project in the second TMK hierarchy, and to resolve any name conflicts,
   h) writing the TMK format of the element to the project.

9. The method of claim 8, wherein:
   the step of transporting the XML document the second TMK hierarchy is performed using a telecommunications transport protocol.

10. The method of claim 8 wherein the step of interacting with the user to resolve name conflicts further comprises the steps of:
   a) displaying to the user the element to be imported where the element name conflicts with the name of an element in the project,
   b) displaying to the user one or more possible actions to resolve the name conflict,
   c) receiving from the user a response selecting one of the one or more possible actions, and d) taking the action selected.

* * * * *